United States Patent [19]

Fukami et al.

[11] Patent Number: 4,866,636
[45] Date of Patent: Sep. 12, 1989

[54] METHOD AND APPARATUS FOR UNIFORMLY ENCODING DATA OCCURRING WITH DIFFERENT WORD LENGTHS

[75] Inventors: Tadashi Fukami; Kentaro Odaka, both of Kangawa, Japan

[73] Assignee: Sony Corporation, Tokyo, Japan

[21] Appl. No.: 40,253

[22] Filed: Apr. 20, 1987

Related U.S. Application Data

[60] Division of Ser. No. 867,893, May 20, 1986, Pat. No. 4,688,255, which is a continuation of Ser. No. 611,748, May 18, 1984, abandoned.

[30] Foreign Application Priority Data

May 21, 1983 [JP] Japan ................... 58-89589

[51] Int. Cl.$^4$ .................. G06F 3/05; G06F 5/06; G03M 7/30
[52] U.S. Cl. .................. 364/514; 364/715.02; 364/951.3
[58] Field of Search .......... 364/514, 200, 900, 715.02; 360/48

[56] References Cited

U.S. PATENT DOCUMENTS

| | | | |
|---|---|---|---|
| 4,346,474 | 8/1982 | Sze | 371/50 |
| 4,386,416 | 5/1983 | Giltner et al. | 364/900 |
| 4,389,681 | 6/1983 | Tanaka et al. | 360/48 X |
| 4,402,021 | 8/1983 | Sonoda et al. | 360/48 X |
| 4,437,185 | 3/1984 | Sako | 371/37 |
| 4,449,536 | 5/1984 | Weaver | 364/715.02 |
| 4,464,747 | 8/1984 | Groudon | 371/50 |
| 4,495,623 | 1/1985 | George | 371/38 |
| 4,497,058 | 1/1985 | Sako | 371/37 |
| 4,507,782 | 3/1985 | Kunimasa | 371/37 |
| 4,539,605 | 9/1985 | Hoshino et al. | 360/48 X |
| 4,541,092 | 9/1985 | Sako | 371/37 |
| 4,541,093 | 9/1985 | Furuya | 371/38 |
| 4,751,742 | 6/1988 | Meeker | 364/715.02 |

Primary Examiner—Felix D. Gruber
Attorney, Agent, or Firm—Lewis H. Eslinger; Jay H. Maioli; Donald S. Dowden

[57] ABSTRACT

A data transmitting system uniformly processes and transmits data by taking a plurality of samples of an analog signal and generating bits forming digital words respectively corresponding to the samples, the number of bits representing each sample being switchable between a plurality of values M and N. First input data is supplied in first words of which each consists of M bits and second input data is supplied occurring in second words of which each consists of N bits. An a-th first word in each M-bit first input data is defined as $W_a$. The first input data is divided into k kinds of sets of $(W_{nk+1})$, $(W_{nk+2})$, ..., $(W_{nk+k})$, where n is an arbitrary integer. A b-th word in each N-bit second input data is defined as $W_b$. The second input data is divided into k kinds of sets of $(W'_{nk+1})$, $(W'_{nk+2})$, ..., $(W'_{nk+k})$, the number of bits of the first words of the set of $(W_{nk+m})$ (m being an integer from 1 to k) being equal to the number of bits of the second words in the set of $(W'_{nk+m})$. The data separately processed and transmitted in each of the sets.

16 Claims, 11 Drawing Sheets

| | 0 | 1 | | 23 | 24 | 25 | | 47 |
|---|---|---|---|---|---|---|---|---|
| | 0 | 6 | | 138 | 1 | 7 | | 139 |
| | 2 | 8 | | 140 | 3 | 9 | | 141 |
| | 4 | 10 | | 142 | 5 | 11 | | 143 |
| | 144 | 150 | | 282 | 145 | 151 | | 283 |
| | 146 | 152 | | 284 | 147 | 153 | | 285 |
| | 148 | 154 | | 286 | 149 | 155 | | 287 |
| | 288 | 294 | | 426 | 289 | 295 | | 427 |
| | 290 | | | | | | | |
| | 292 | | | | | | | |
| | 432 | 438 | | 570 | 433 | 439 | | 571 |
| | 434 | | | | | | | |
| | 436 | | | | | | | |
| | 576 | 582 | | 714 | 577 | 583 | | 715 |
| | 578 | | | 716 | | | | 717 |
| | 580 | | | 718 | | | | 719 |

EVEN WORDS — ODD WORDS

15 WORDS

Fig. 9

|  | 0 | 1 | 2 | --- | 23 | 24 | 25 | 26 | --- | 47 |
|---|---|---|---|---|---|---|---|---|---|---|
|  | 0 | 8 | 16 |  | 184 | 1 | 9 | 17 |  | 185 |
|  | 2 | 10 | 18 |  | 186 | 3 | 11 | 19 |  | 187 |
|  | 4 | 12 | 20 |  | 188 | 5 | 13 | 21 |  | 189 |
|  | 6 | 14 | 22 |  | 190 | 7 | 15 | 23 |  | 191 |
|  | 192 | 200 | 208 |  | 376 | 193 | 201 | 209 |  | 377 |
|  | 194 | 202 | 210 |  | 378 | 195 | 203 | 211 |  | 379 |
|  | 196 | 204 | 212 |  | 380 | 197 | 205 | 213 |  | 381 |
|  | 198 | 206 | 214 |  | 382 | 199 | 207 | 215 |  | 383 |
| 20 WORDS | 384 | 392 | 400 |  | 568 | 385 | 393 | 401 |  | 569 |
|  | 386 | 394 | 402 |  | 570 | 387 | 395 | 403 |  | 571 |
|  | 388 | 396 | 404 |  | 572 | 389 | 397 | 405 |  | 573 |
|  | 390 | 398 | 406 |  | 574 | 391 | 399 | 407 |  | 575 |
|  | 576 | 584 | 592 |  | 760 | 577 | 585 | 593 |  | 761 |
|  | 578 | 586 | 594 |  | 762 | 579 | 587 | 595 |  | 763 |
|  | 580 | 588 | 596 |  | 764 | 581 | 589 | 597 |  | 765 |
|  | 582 | 590 | 598 |  | 766 | 583 | 591 | 599 |  | 767 |
|  | 768 | 776 | 784 |  | 952 | 769 | 777 | 785 |  | 953 |
|  | 770 | 778 | 786 |  | 954 | 771 | 779 | 787 |  | 955 |
|  | 772 | 780 | 788 |  | 956 | 773 | 781 | 789 |  | 957 |
|  | 774 | 782 | 790 |  | 958 | 775 | 783 | 791 |  | 959 |

EVEN WORDS | ODD WORDS

Fig. 10A

← 16 BLOCKS → ← 48 BLOCKS →

| row | 0 | 1 | ... | 16 | 17 | 18 | 19 | 20 | 21 | ... | 62 | 63 |
|---|---|---|---|---|---|---|---|---|---|---|---|---|
| 0 | Q00 | Q01 | | L0A / R0A | L292A / R292A | L6A | L298A | L12A | L304A | | L138A | L430A |
| 1 | Q02 | Q03 | | L0B / R0B | L292B / R292B | L6B | L298B | L12B | L304B | | L138B | L430B |
| 2 | Q04 | Q05 | | L2A / R2A | L432A / R432A | L8A | L438A | L14A | L444A | | L140A | L570A |
| 3 | Q06 | Q07 | | L2B / R2B | L432B / R432B | L8B | L438B | L14B | L444B | | L140B | L570B |
| 4 | Q08 | Q09 | | L4A / R4A | L434A / R434A | L10A | L440A | L16A | L446A | | L142A | L572A |
| 5 | Q010 | Q011 | | L4B / R4B | L434B / R434B | L10B | L440B | L16B | L446B | | L142B | L572B |
| 6 | Q012 | Q013 | | L144A / R144A | L436A / R436A | L150A | L442A | L156A | L448A | | L282A | L574A |
| 7 | Q014 | Q015 | | L144B / R144B | L436B / R436B | L150B | L442B | L156B | L448B | | L282B | L574B |
| 8 | Q016 | Q017 | | L146A / R146A | L576A / R576A | L152A | L582A | L158A | L588A | | L284A | L714A |
| 9 | Q018 | Q019 | | L146B / R146B | L576B / R576B | L152B | L582B | L158B | L588B | | L284B | L714B |
| 10 | Q020 | Q021 | | L148A / R148A | L578A / R578A | L154A | L584A | L160A | L590A | | L286A | L716A |
| 11 | Q022 | Q023 | | L148B / R148B | L578B / R578B | L154B | L584B | L160B | L590B | | L286B | L716B |
| 12 | Q024 | Q025 | | L288A / R288A | L580A / R580A | L294A | L586A | L300A | L592A | | L426A | L718A |
| 13 | Q026 | Q027 | | L288B / R288B | L580B / R580B | L294B | L586B | L300B | L592B | | L426B | L718B |
| 14 | Q028 | Q029 | | L290A / R290A | P160 / P170 | L296A | P | L302A | P | | L428A | P |
| 15 | P00 | P10 | | L290B / R290B | P161 / P171 | L296B | | L302B | | | L428B | |
| ... | | | | | | | | | | | | |
| 29 | | | | | | | | | | | | |
| 30 | P01 | P11 | | | | | | | | | | |
| 31 | | | | | | | | | | | | |

Fig. 10B

| | 64 | 65 | 66 | 67 | 68 | 69 | | 110 | 111 | 112 | 113 | 127 |
|---|---|---|---|---|---|---|---|---|---|---|---|---|
| 0 | L1A / R1A | L293A / R293A | L7A | L299A | L13A | L305A | | L139A | L431A | | | |
| 1 | L1B / R1B | L293B / R293B | L7B | L299B | L13B | L305B | | L139B | L431B | | | |
| 2 | L3A / R3A | L433A / R433A | L9A | L439A | L15A | L445A | | L141A | L571A | | | |
| 3 | L3B / R3B | L433B / R433B | L9B | L439B | L15B | L445B | | L141B | L571B | | | |
| 4 | L5A / R5A | L435A / R435A | L11A | L441A | L17A | L447A | | L143A | L573A | | | |
| 5 | L5B / R5B | L435B / R435B | L11B | L441B | L17B | L447B | | L143B | L573B | | | |
| 10 | L145A / R145A | L437A / R437A | L151A | L443A | L157A | L449A | | L283A | L575A | | | |
| | L145B / R145B | L437B / R437B | L151B | L443B | L157B | L449B | | L283B | L575B | | | |
| | L147A / R147A | L577A / R577A | L153A | L583A | L159A | L589A | | L285A | L715A | | | |
| 15 | L147B / R147B | L577B / R577B | L153B | L583B | L159B | L589B | | L285B | L715B | | | |
| | L149A / R149A | L579A / R579A | L155A | L585A | L161A | L591A | | L287A | L717A | | | |
| 21 | L149B / R149B | L579B / R579B | L155B | L585B | L161B | L591B | | L287B | L717B | | | |
| | L289A / R289A | L581A / R581A | L295A | L587A | L301A | L593A | | L427A | L719A | | | |
| 29 | L289B / R289B | L581B / R581B | L295B | L587B | L301B | L593B | | L427B | L719B | | | |
| 30 | L291A / R291A | P 640 / P 650 | L297A | P | L303A | P | | L429A | P | P | | Q |
| 31 | L291B / R291B | P 641 / P 651 | L297B | | L303B | | | L429B | | | | |

←―――― 48 BLOCKS ――――→ ←― 16 BLOCKS ―→

Fig. 11A

| Fig.11 | |
|---|---|
| Fig.11A | Fig.11B |

|    | 0 | 1 | 15 |
|----|-----|-----|-----|
| 0  | $Q_{00}$ | $Q_{01}$ | |
| 1  | $Q_{01}$ | $Q_{11}$ | |
| 2  | $Q_{02}$ | $Q_{03}$ | |
| 3  | $Q_{12}$ | $Q_{13}$ | |
| 4  | $Q_{04}$ | $Q_{05}$ | |
| 5  | $Q_{14}$ | $Q_{15}$ | |
| 6  | $Q_{06}$ | $Q_{07}$ | |
| 7  | $Q_{16}$ | $Q_{17}$ | |
| 8  | $Q_{08}$ | $Q_{09}$ | |
| 9  | $Q_{18}$ | $Q_{19}$ | |
| 10 | $Q_{010}$ | $Q_{011}$ | |
| 11 | $Q_{110}$ | $Q_{111}$ | |
| 12 | $Q_{012}$ | $Q_{013}$ | |
| 13 | $Q_{112}$ | $Q_{113}$ | |
| 14 | $Q_{014}$ | $Q_{015}$ | |
| 15 | $Q_{114}$ | $Q_{115}$ | |
| 28 | $Q_{028}$ | $P_{00}$ | |
| 29 | $Q_{128}$ | $P_{10}$ | |
| 30 | $Q_{029}$ | $P_{01}$ | |
| 31 | $Q_{129}$ | $P_{11}$ | |

Fig. 11B

| 16 | | | 17 | | 18 | |
|---|---|---|---|---|---|---|
| $L'_{0A}$ | | $L'_{0B-1}$ | $L'_{388B-2}$ | $L'_{390A-1}$ | $L'_{8A}$ | $L'_{8B-1}$ |
| $R'_{0A}$ | | $R'_{0B-1}$ | $R'_{388B-2}$ | $R'_{390A-1}$ | $R'_{8A}$ | $R'_{8B-1}$ |
| $L'_{0B-2}$ | $L'_{2A-1}$ | $L'_{390A-2}$ | $L'_{390B}$ | | $L'_{8B-2}$ | $L'_{10A-1}$ |
| $R'_{0B-2}$ | $R'_{2A-1}$ | $R'_{390A-2}$ | $R'_{390B}$ | | $R'_{8B-2}$ | $R'_{10A-1}$ |
| $L'_{2A-2}$ | $L'_{2B}$ | | $L'_{576A}$ | $L'_{576B-1}$ | $L'_{10A-2}$ | $L'_{10B}$ |
| $R'_{2A-2}$ | $R'_{2B}$ | | $R'_{576A}$ | $R'_{576B-1}$ | $R'_{10A-2}$ | $R'_{10B}$ |
| $L'_{4A}$ | | $L'_{4B-1}$ | $L'_{576B-2}$ | $L'_{578A-1}$ | $L'_{12A}$ | $L'_{12B-1}$ |
| $R'_{4A}$ | | $R'_{4B-1}$ | $R'_{576B-2}$ | $R'_{578A-1}$ | $R'_{12A}$ | $R'_{12B-1}$ |
| $L'_{4B-2}$ | $L'_{6A-1}$ | $L'_{578A-2}$ | $L'_{578B}$ | | $L'_{12B-2}$ | $L'_{14A-1}$ |
| $R'_{4B-2}$ | $R'_{6A-1}$ | $R'_{578A-2}$ | $R'_{578B}$ | | $R'_{12B-2}$ | $R'_{14A-1}$ |
| $L'_{6A-2}$ | $L'_{6B}$ | | $L'_{580A}$ | $L'_{580B-1}$ | $L'_{14A-2}$ | $L'_{14B}$ |
| $R'_{6A-2}$ | $R'_{6B}$ | | $R'_{580A}$ | $R'_{580B-2}$ | $R'_{14A-2}$ | $R'_{14B}$ |
| $L'_{192A}$ | | $L'_{192B-1}$ | $L'_{580B-2}$ | $L'_{582A-1}$ | $L'_{200A}$ | $L'_{200B-1}$ |
| $R'_{192A}$ | | $R'_{192B-1}$ | $R'_{580B-2}$ | $R'_{582A-1}$ | $R'_{200A}$ | $R'_{200B-1}$ |
| $L'_{192B-2}$ | $L'_{194A-1}$ | $L'_{582A-2}$ | $L'_{582B}$ | | $L'_{200B-2}$ | $L'_{202A-1}$ |
| $R'_{192B-2}$ | $R'_{194A-1}$ | $R'_{582A-2}$ | $R'_{582B}$ | | $R'_{200B-2}$ | $R'_{202A-1}$ |

| $L'_{386A-2}$ | $L'_{386B}$ | $P_{160}$ | $L'_{394A-2}$ | $L'_{394B}$ |
|---|---|---|---|---|
| $R'_{386A-2}$ | $R'_{386B}$ | $P_{170}$ | $R'_{394A-2}$ | $R'_{394B}$ |
| $L'_{388A}$ | $L'_{388B-1}$ | $P_{161}$ | $L'_{396A}$ | $L'_{396B-1}$ |
| $R'_{388A}$ | $R'_{388B-1}$ | $P_{171}$ | $R'_{396A}$ | $R'_{396B-1}$ |

METHOD AND APPARATUS FOR UNIFORMLY ENCODING DATA OCCURRING WITH DIFFERENT WORD LENGTHS

This is a divisional of application Ser. No. 06/867,8893, filed May 20, 1986, now U.S. Pat. No. 4,688,255 issued 8-18-87, which is a file wrapper continuation of application Ser. No. 06/611,748, filed May 18, 1984, now abandoned.

BACKGROUND OF THE INVENTION

1. Field of the Invention

The present invention relates to a method of transmitting data sequence which is suitable for use in, for example, an audio PCM tape recorder and, more particularly, to a method for encoding error-correction-code which is applied to record, e.g., an audio PCM signal on a magnetic tape by a rotary head.

2. Description of the Prior Art

There is known a method for performing the error detection or encoding error correction codes in the longitudinal and lateral directions of digital information data arranged like a matrix, respectively. As one method in case of transmitting these codes for every column and decoding them on the reception side, there is considered a method whereby the error detection is performed by a first error detection code for each column, a pointer as a result of this is produced, and the data and pointer of each column are stored in a memory, then the error correction is performed for every row by a second error correction code with reference to this pointer.

On one hand, the number of quantization bits of the audio PCM signal may vary in dependence upon the objects in use of the audio PCM signal recording/reproducing apparatus, or the like. Namely, to record and reproduce the audio signal with high quality, the sampling frequency $f_s$ is set into 48 kHz and the number of quantization bits is set into sixteen bits. To record and reproduce the voice signal at a conference and the like, the sampling frequency $f_s$ is set into 32 kHz and the number of non-linear quantization bits is set into twelve bits. When the sampling frequency is low, this enables the recording and reproduction to be performed at a half speed of the standard running speed of the magnetic tape (i.e., of the standard rotational speed of the rotary head), so that it is effective to reduce an amount of magnetic tape as the recording medium to be consumed.

It is desirable that the encoder and decoder for performing the error detection and error correction as mentioned above are constituted by a common hardware regarding a plurality of number of quantization bits and that they have the similar error correcting ability even in any cases.

OBJECTS AND SUMMARY OF THE INVENTION

It is an object of the present invention to provide a method of transmitting data sequence, wherein in the case where the number of bits of a sampling word is switched, the error correcting ability does not deteriorate even in any bit number.

Another object of the invention is to provide a method for encoding error-correction-code which is generally used and which can cope with a plurality of number of quantization bits.

Still another object of the invention is to provide a method for encoding error-correction-code, wherein in the case where errors which exceed the correcting ability of the error-correction-code occur, a problem such that the data is vainly lost due to a difference in number of quantization bits is not caused.

According to the present invention, the above objects are accomplished by a method of transmitting data sequence, wherein an input data sequence of which one word consists of M bits is transmitted as a transmission data sequence of which one word consists of N bits; when it is assumed that the a-th word from a certain time in the input data sequence is $W_a$, the input data sequence is divided into k kinds of sets consisting of $(W_{nk+1})$, $(W_{nk+2})$, ..., $(W_{nk+k})$ (where, n: arbitrary integer); when it is assumed that the b-th word from a certain time in the transmission data sequence is $W'_b$, the transmission data sequence is divided into k kinds of sets consisting of $(W'_{nk+1})$, $(W'_{nk+2})$, ..., $(W'_{nk+k})$; and all bits of the words in the set of $(W_{nk+m})$ are the bits of the words in the set of $(W'_{nk+m})$.

Another feature of the invention is that there is provided a method for encoding error-correction-code, whereby the error detection or the encoding for error correction is performed for the digital information data in which a plurality of blocks each consisting of a plurality of symbols are arranged with regard to each of a plurality of directions; and that when it is assumed that symbol lengths of the digital information data are set into a plurality of kinds of $l_1, l_2, ..., l_n$, a length of one sequence of one encoding operation among a plurality of encoding operations is determined to a value of integer times the least common multiple of $(l_1, l_2, ..., l_n)$, thereby allowing the symbols in the digital information data to be included in the unit of the least common multiple of this one sequence.

The above and other objects, features and advantages of the present invention will be apparent from the following detailed description in conjunction with the accompanying drawings.

BRIEF DESCRIPTION OF THE DRAWINGS

FIG. 7 is a block diagram showing a constitution of an example of a bit arrangement circuit;

FIGS. 8, 9, 10, 11A, and 11B are schematic diagrams showing more practical code constitutions of one embodiment of the invention;

DETAILED DESCRIPTION OF THE PREFERRED EMBODIMENTS

Figure 1:
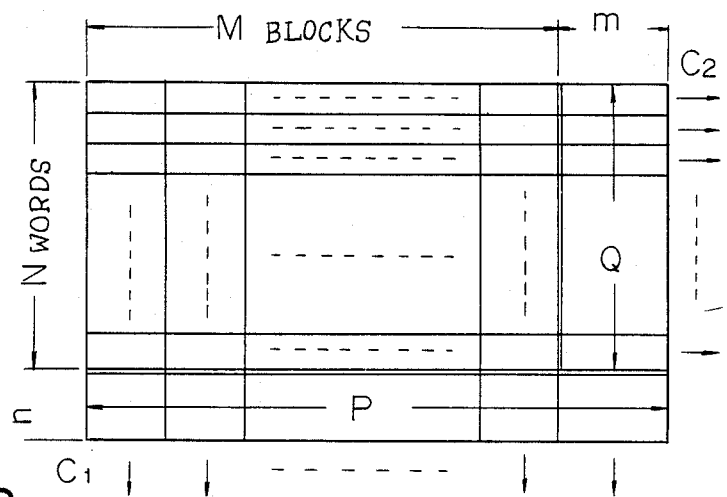
FIGS. 1 and 2 are schematic diagrams showing code constitutions of one embodiment of the present invention.

One embodiment of the present invention intends to record an audio PCM signal on a magnetic tape by a rotary head. FIG. 1 shows a code constitution of the audio PCM signal and redundancy data of error correction codes which are recorded in one segment to be formed by the scanning at one time by, e.g., the rotary head.

In FIG. 1, one block consists of each row in the vertical direction and M blocks are arranged in the horizontal direction. The audio PCM signal in one block consists of N words, so that the audio PCM signal consisting of total (N×M) words is arranged. An error detection code $C_1$ is added in each block in the vertical direction of such a two-dimensional array of this audio PCM signal, while an error correction code $C_2$ is added to its horizontal direction. A check code P of n words of this error detection code $C_1$ is included in each block, and the error detection code $C_1$ is also encoded even with respect to a check code Q of m words of the error correction code $C_2$.

The above error correction codes are recorded on the magnetic tape sequentially from the 0th block. The signal reproduced from the magnetic tape is first subjected to error detection in each block by the error detection code $C_1$ and the error detection is performed on a block unit basis. As a result of this detection, a pointer indicative of the presence/absence of an error is generated for every block. For example, as shown by the hatched portions in FIG. 2, the 0th and i-th blocks are detected as the blocks where errors are present. The error correction by the error correction code $C_2$ is performed in the horizontal direction using the error location indicated by this pointer.

The word number N of one block of the foregoing error detection code $C_1$ is the number in the case where the word length of the audio PCM data is $l_1$ bits, e.g., 16 bits. Also, even in the case where the word length of the audio PCM data is $l_2$ bits, e.g., 12 bits, the similar processing for error correction encoding is carried out. In this case, a size of two-dimensional plane where $C_1$ and $C_2$ are encoded, namely, the number of all bits is made equal with respect to both word lengths of $l_1$ and $l_2$. Therefore, the data of one block as one code sequence of the error detection code $C_1$ has a length of $(N \times l_1)$ bits, while the data of one code sequence of the error correction code $C_2$ has a length of $(M \times l_1)$ bits.

When it is assumed that the continuous PCM data are arranged sequentially in the direction of the $C_2$ sequence from the first row of the two-dimensional array shown in FIG. 1, a plurality of words included in one code sequence of the error detection code $C_1$ will not become continuous words. For instance, when the PCM data are arranged sequentially from the first row in the horizontal direction such that the 16-bit data words $W_0, W_1, W_2, \ldots$, or the 12-bit data words $W'_0, W'_1, W'_2, \ldots$, the words of $(W_0, W_M, W_{2M}, \ldots)$ are included in the 0th block in case of 16 bits, while the words of $(W'_0$ and a part of $W'_1; W'_{(4/3)M}$ and a part of $W'_{(4/3)M+1}; \ldots)$ are included in the 0th block in case of 12 bits. Therefore, when the 0th block is detected as an error, this error word is distributed on a word unit basis as shown in FIG. 3A.

Figure 3A:
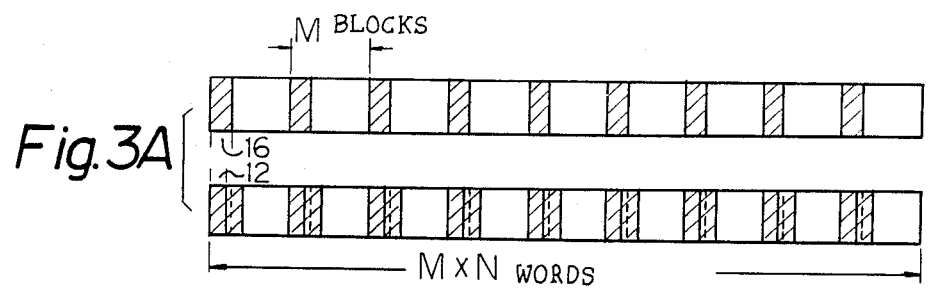
FIGS. 3A to 3E are schematic diagrams which are used to describe the error correcting operation of one embodiment of the invention.
Figure 3B:
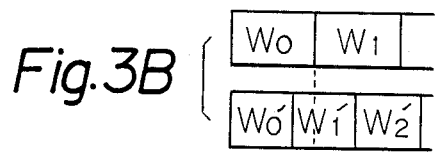

Assuming that the error detection of the error detection code $C_1$ is performed using $l_1$ bits as a unit, when a similar error is caused, as is obvious from FIGS. 3A and 3B, the error is detected as the two-word error in the case where the word length is 12 bits. For example, two words of $W'_0$ and $W'_1$ are detected as the error words in correspondence upon the error word of one word $W_0$. That is, the PCM data of the number of words which is twice the number of words which cannot be used when the word length is $l_1$ bits could not have been used. If a symbol length of the error detection code $C_1$ is changed for every word length, such a problem will not be caused, but the encoder and decoder cannot be realized by the common constitution in such a case.

Therefore, in this invention, a length of this one block is set into a value which is integer times the least common multiple L of the word lengths $l_1$ and $l_2$.

Figure 3C:
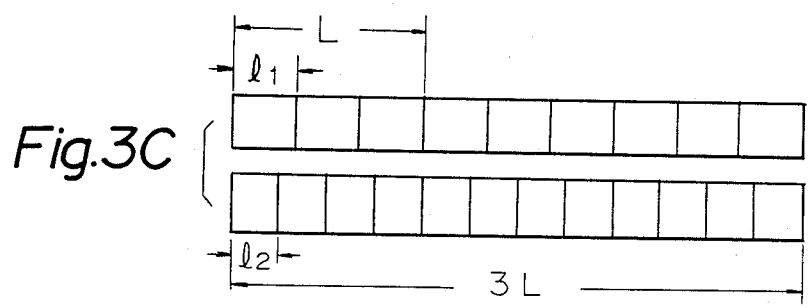

That is, as shown in FIG. 3C, a length of the code sequence s selected to be a value which is, e.g., three times the least common multiple L. In the cases of 16 bits and 12 bits, (L=48 bits) and nine words each having a word length of 16 bits are included in one block, while twelve words each having a word length of twelve bits are included in one block. In addition, for example, the adjacent words of the audio PCM data are arranged as three or four words included in this least common multiple L.

Figure 2:
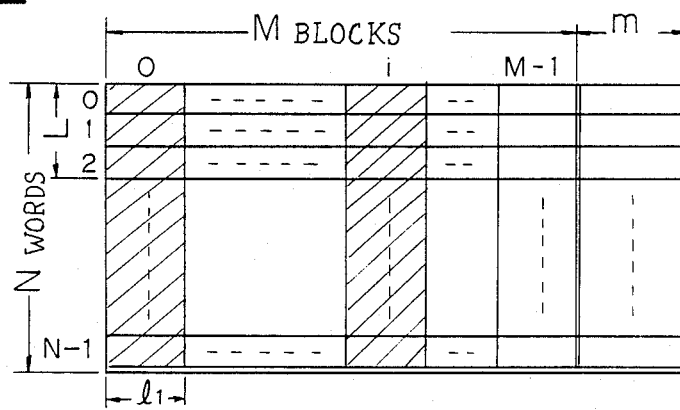
Figure 3D:
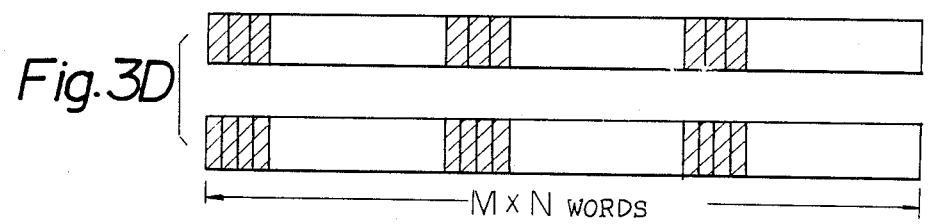
Figure 3E:
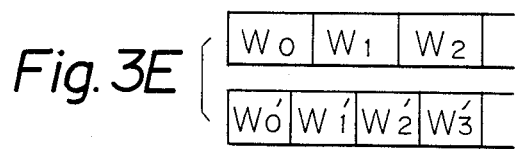

It is now assumed that the audio PCM data of the two-dimensional array as shown in FIG. 2 has an arrangement such that every three words are the continuous data in each block with respect to 16-bit data and such that they are interleaved on a block unit basis. It is also assumed that such an audio PCM data is rearranged into one data sequence in accordance with the original sequence. It will then be discussed the case where the 0th block is detected as an error by the error detection code $C_1$ under such conditions. This data which was detected as the error has such a distribution as indicated by the hatched portions in FIG. 3D. Namely, when the word length is 16 bits, the error having a group of continuous three words as a unit occurs. On one hand, in case of the word length of 12 bits, the error having a group of continuous four words as a unit occurs. FIG. 3E shows an enlarged diagram of this one unit, in which the continuous three words $W_0, W_1$ and $W_2$ each having a word length of 16 bits are the error words and in correspondence upon this, the continuous four words $W'_0, W'_1, W'_2,$ and $W'_3$ each having a word length of 12 bits become the error words.

Therefore, if the cases where the 0th block is detected as the error and where, the error correction is impossible occur similarly in both cases of 16-bit words and 12-bit words, the data of nine words and twelve words cannot be used, so that it is necessary to interpolate them. In general, the number of words which cannot be used when a word length is $l_2$ bits is $(l_1/l_2)$ times the number of words which cannot be used when a word length is $l_1$ bits.

In other words, in the foregoing example, according to the present invention, it is possible to suppress the number of words which cannot be used when a word length is $l_1$ bits into 1.33 times instead of two times. This effect will be similarly obtained even when a word length of the code sequence of the error detection code $C_1$ is unified into $l_2$ bits.

On the other hand, as is obvious from FIGS. 3B and 3E, in the above method as well, both of the odd number word $W_{2n+1}$ (or $W'_{2n+1}$) and the even number word $W_{2n}$ (or $W'_{2n}$) will have been included in one word slot.

Figure 4:
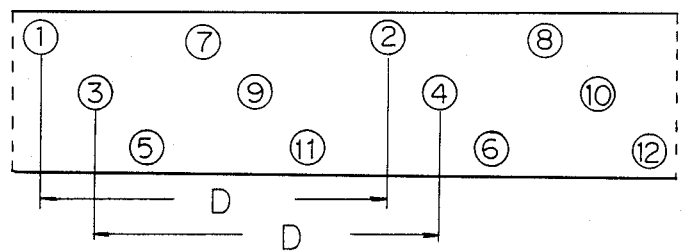
FIG. 4 is a schematic diagram which is used to describe the even/odd interleave.

When the audio PCM signal is recorded as an oblique track using a rotary head, a set of odd number words and a set of even number words are recorded in the former half of the track and in the latter half thereof, respectively. Even when the audio PCM signal is recorded in the longitudinal direction of the magnetic tape by a fixed head, as shown in FIG. 4, a set of odd number words and a set of even number words are divisionally recorded such that the recording locations of the adjacent two words are apart from one another by only D. This method is called an even/odd interleave and even if a burst error occurs due to the dropout or the like upon reproduction, it is possible to interpolate it by a mean value of the words without an error which are located before and behind the error word. However, as mentioned above, if the odd number and even number words of the audio PCM signal are included in one word which is processed as the odd number words, even if the even/odd interleave is performed, the error correcting ability will remarkably deteriorate.

Therefore, in another embodiment of the invention, when (M=12 bits) and (N=16 bits) and (k=2), the audio PCM data is divided into a set of odd number data and a set of even number data.

Figure 5A:
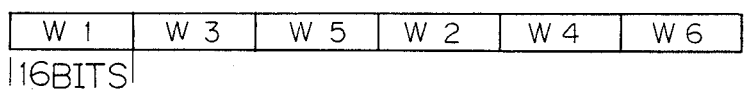
FIGS. 5A to 5C are schematic diagrams which is used to describe another embodiment of the invention.
Figure 5B:
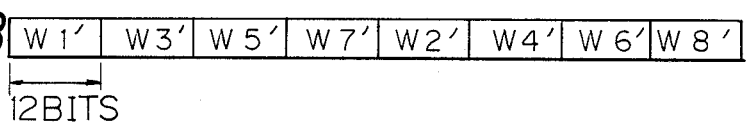

As shown in FIG. 5A, a PCM tape recorder is constituted so as to record the data sequence which was divided into a set of odd number words of ($W_1$, $W_3$, $W_5$) each having 16 bits and a set of even number words of ($W_2$, $W_4$, $W_6$) each having 16 bits. In correspondence upon this, when the audio PCM signal of which one word consists of 12 bits is recorded, as shown in FIG. 5B, the data sequence is divided into a set of odd number words of ($W'_1$, $W'_3$, $W'_5$, $W'_7$) and a set of even number words of ($W'_2$, $W'_4$, $W'_6$, $W'_8$). Each set is allocated into a time slot of 16 bits. In this case, the 12-bit words are divided so that only the odd number words are included in the same time slot as shown in an enlarged diagram in FIG. 5C. Similarly, the 12-bit words are divided so that only the even number words are included in the same time slot. After such a bit arrangement was performed, the PCM tape recorder executes substantially the same processing as in the case where the bit number is 16 bits, thereby to produce the recording signal.

Figure 6:
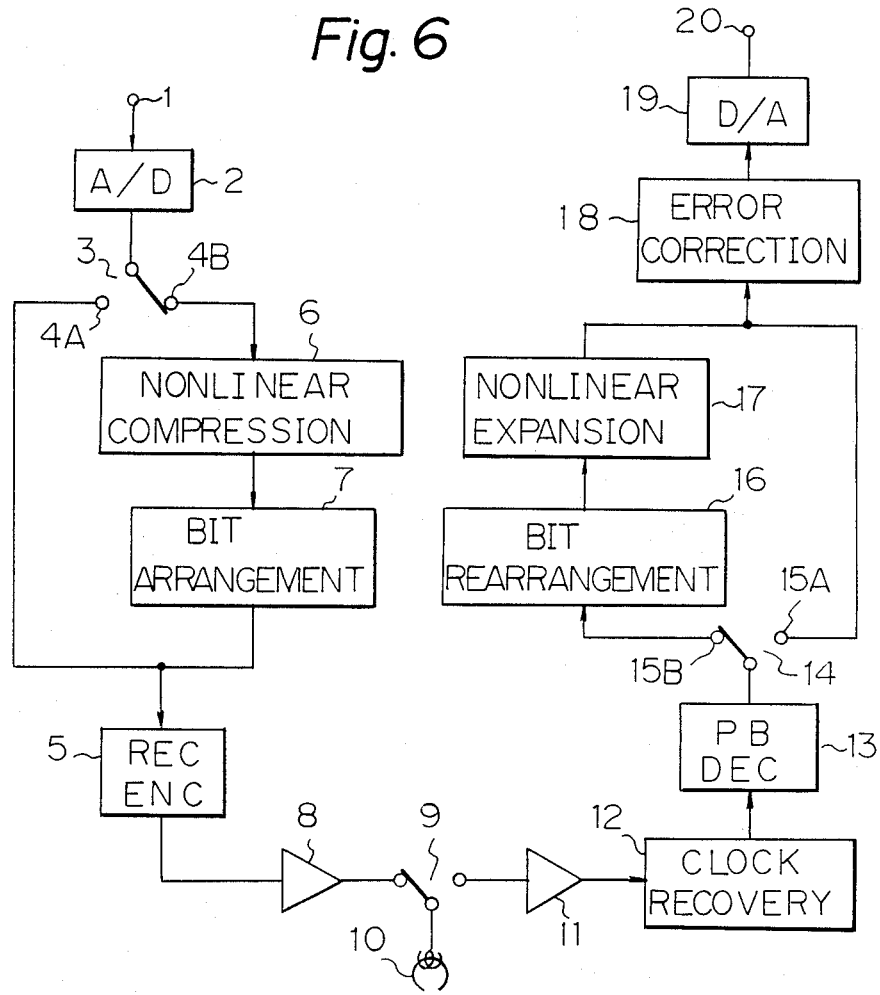
FIG. 6 is a block diagram showing a circuit arrangement of one embodiment of the invention.

FIG. 6 shows recording and reproducing circuits in another embodiment of the present invention, in which the analog audio signal is supplied to an input terminal 1. This audio signal is converted into the audio PCM signal of which one word consists of sixteen bits by an A/D converter 2. This audio PCM signal is supplied to an input terminal of a switching circuit 3. One output terminal 4A of the switching circuit 3 is connected to an input terminal of a recording encoder 5, while the other output terminal 4B is connected to an input terminal of a digital non-liner compression circuit 6.

The switching circuit 3 selects the output terminal 4A when the data of which the number of bits of a sampling word is sixteen bits is recorded, while it selects the output terminal 4B when the data of which the sampling word has twelve bits is recorded. In addition, the sampling frequency is switched between 48 kHz and 32 kHz in association with the change-over of this switching circuit 3. Therefore, in case of the 16-bit format, the sampling is performed at a frequency of 48 kHz and the linearly quantized audio PCM signal is supplied as it is to the recording encoder 5. On the contrary, in case of the 12-bit format, sixteen bits are compressed to twelve bits by the non-linear compression circuit 6 and this compressed 12-bit data is further supplied to a bit arrangement circuit 7. An output of the bit arrangement circuit 7 is supplied to the recording encoder 5.

Figures 7, 8:
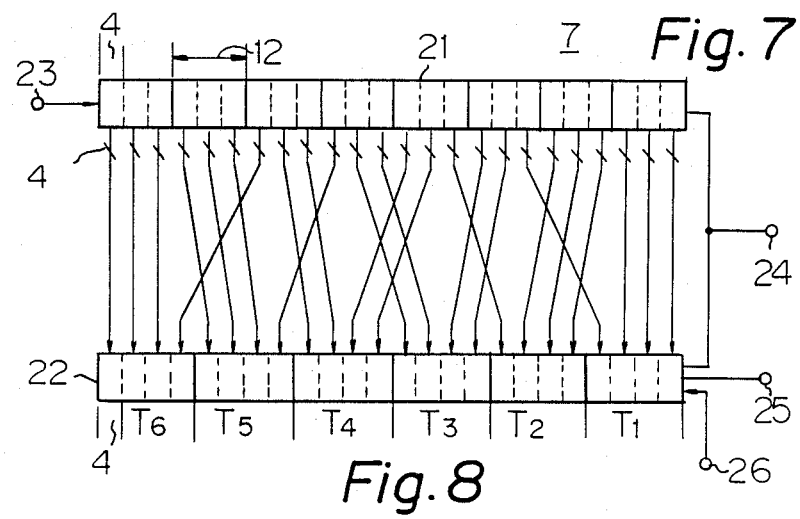

FIG. 7 shows an example of the bit arrangement circuit 7. This circuit 7 is constituted by a shift register 21 of serial-in/parallel-out and a shift register 22 of parallel-in/serial-out. The shift register 21 consists of (12 bits×8=96 bits) and the shift register 22 consists of (16 bits×6=96 bits). In FIG. 7, the signal lines between the shift registers 21 and 22 are combined on a four-bit unit basis.

Figure 5C:
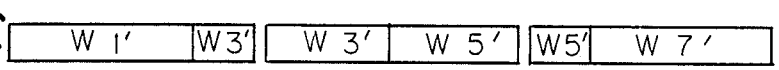

The audio PCM signal of which each one word was compressed to 12 bits is supplied from an input terminal 23 to the shift register 21. A shift clock is supplied from a terminal 24 to the shift registers 21 and 22 at a rate of once per bit. A parallel output of this shift register 21 becomes a parallel input of the shift register 22. The connection between these shift registers 21 and 22 is as shown in FIG. 7. It is now assumed that the time slots each having 16 bits are $T_1$ to $T_6$ sequentially from the side where an output terminal 25 of the shift register 22 is led out. In this case, the odd number words are divided and inserted into the time slots $T_1$, $T_3$ and $T_5$ as shown in FIG. 5C, while the even number words are similarly divided and inserted into the time slots $T_2$, $T_4$ and $T_6$. The shift register 22 loads the output of the shift register 21 at a rate of once whenever eight words each consisting of 12 bits, i.e., 96 bits are shifted in response to a load pulse from a terminal 26. A serial output from the shift register 22 is fetched from the output terminal 25.

In addition to a combination circuit arrangement using the shift registers as mentioned above, the bit arrangement circuit 7 may be constituted by a RAM and its control circuit as will be mentioned later.

The recording encoder 5 encodes the error correction codes using 16 bits as one word and performs the even/odd interleave for separating the respective recording locations of the adjacent odd number data and even number data. An output of this recording encoder 5 is supplied to a magnetic head 10 through a recording amplifier 8 and a recording/reproduction change-over switch 9. The audio PCM signal of which the error correction codes were encoded is recorded on a magnetic tape (not shown) in its longitudinal direction by the magnetic head 10. The sampling frequency is set to be low and the bit number is reduced from 16 bits to 12 bits, so that an amount of recording data is reduced by half and the running speed of the magnetic tape is also reduced by half.

It is also possible to adopt a multi-track method whereby a plurality of tracks are provided in the direction of a width of the magnetic tape or a recording method using a rotary head.

Upon reproduction, the signal to be reproduced by the magnetic head 10 is supplied to a clock recovery circuit 12 through the recording/reproduction change-over switch 9 and a reproducing amplifier 11. The clock recovery circuit 12 is constituted as a PLL to produce a bit clock synchronized with the reproduction signal. The reproduced bit clock is used for the data processing upon reproduction. The reproduction signal appearing in an output of the clock recovery circuit 12 is supplied to a reproducing decoder 13.

In the reproducing decoder 13, the deinterleave for returning the odd number data and even number data which have been recorded in the separate locations to the inherent sequence and the error correction are executed. Sizes of errors which can be corrected by the error correction codes to be used differ. As the error correction codes, Reed Solomon Codes, simple parity, adjacent codes, etc. can be used. These codes may be combined as a form of product codes or may be used together with the CRC codes for error detection.

The audio PCM signal which was returned to the original time sequence is fetched as an output of the reproducing decoder 13. This reproduction signal is supplied to a switching, circuit 14. One output terminal 15A of this switching circuit 14 is connected to an input terminal of an error correction circuit 18 and the other output terminal 15B is connected to an input terminal of a bit rearrangement circuit 16. The switching circuit 14 selects the output terminal 15A when the bit number of the sampling word is sixteen bits and selects the output terminal 15B when it is twelve bits. This switching operation of the switching circuit 14 is automatically performed by, for instance, fetching a format discrimination signal added to the recording signal upon reproduction.

The bit rearrangement circuit 16 serves to return the 16-bit word inserted into each time slot into the 12-bit word. This bit rearrangement circuit 16 is constituted such that it has the opposite input/output relation to that of the bit arrangement circuit 7 shown in FIG. 5 and that the load pulse is given to the shift register 21. An output of the bit rearrangement circuit 16 is supplied to a digital non-linear expansion circuit 17. This non-linear expansion circuit 17 performs the expansion which is complementary to the compression by the non-linear compression circuit 6, so that the audio PCM signal of which each one word consists of sixteen bits appears as its output.

This output of the non-linear expansion circuit 17 is supplied to the error correction circuit 18. The error correction circuit 18 corrects the error words which could not be corrected by the reproducing decoder 13. The error correction circuit 18 performs the interpolation using a mean value when the words before and behind the error word are correct, while it carries out the operation of front-value holding or post-value holding when only one of the words before and behind the error word is correct. An output of the error correction circuit 18 is supplied to a D/A converter 19, so that the analog audio signal is fetched from an output terminal 20.

Upon reproduction, the switching circuit 14 is switched in accordance with the format of the reproduction data and the running speed of the magnetic tape is also determined in correspondence upon the format.

As in above-described another embodiment of the invention, the bit rearrangement circuit 16 for converting the 16-bit words into the 12-bit words is inserted at the stage after error correction and before error compensation. This is because the error correction to be executed by the reproducing decoder 13 is the processing in which sixteen bits are used as one word and when the error correction was done, the data is completely returned to the original data; on the contrary, the compensation to be performed by the error correction circuit 18 is the arithmetic operation processing in which a word value itself has the meaning.

A more practical example of the embodiment of the present invention will be further described. The signal in the L channel and the signal in the R channel in the two-channel audio signals are sampled at the sampling frequency of 48 kHz, respectively, so that the words $L_i$ and $R_i$ each having sixteen bits are formed. A two-dimensional array corresponding to one segment is constituted by 720 words of $L_0$ to $L_{719}$ and 720 words of $R_0$ to $R_{719}$.

This arrangement method will be explained with reference to FIG. 8. FIG. 8 shows an array of one channel, for example, L channel and the word numbers 0 to 719 are written in the diagram. There are forty eight blocks in this array and the block numbers 0 to 47 are added to the respective blocks and every fifteen words are inserted in each block. The data of these blocks are sequentially recorded on the magnetic tape from the 0th block.

The error word which cannot be corrected among the error words caused due to the errors upon recording and reproducing is interpolated by the correct words before and behind the error word. As mentioned before, to effectively perform this interpolation, the recording locations of the even number designated PCM data and of the odd number designated PCM data in each channel are kept away from each other. Therefore, the even number data $L_0$, $L_2$, $L_4$, ..., $L_{718}$ are arranged in the twenty four blocks of the block numbers (0–23), while the odd number data $L_1$, $L_3$, $L_5$, ..., $L_{719}$ are arranged in the twenty four blocks of the block numbers (24–47).

The PCM data is distributed in each block (0–23) such that the adjacent three words in this data sequence bearing even numbers are arranged as a unit, while the PCM data is distributed in each block (24–47) such that the adjacent three words among the data sequence bearing odd numbers are arranged as a unit. When discussing the even number designated data as an example, three words of ($L_0$, $L_2$, $L_4$) are arranged in the 0th block and three words of ($L_6$, $L_8$, $L_{10}$) are arranged in the first block; in this way, the data are distributed in the similar manner, and three words of ($L_{138}$, $L_{140}$, $L_{142}$) are therefore arranged in the 23rd block. Then, three words of ($L_{144}$, $L_{146}$, $L_{148}$) are again arranged in the 0th block. By repeatedly performing these operations, the even number designated PCM data of total 360 words of ($L_0$–$L_{718}$) are arranged. In addition, the odd number designated PCM data are also arranged in the same manner as described above such that every adjacent three words are arranged as a unit. In such an array, three words in each block are neighboring and the groups each consisting of such three words can be separated.

Furthermore, the other R channel has the similar arrangement as FIG. 8.

On the other hand, in the case where one word consists of twelve bits, as shown in FIG. 9, the data of four words is inserted into the data region of three words when one word consists of sixteen bits even with regard to the words $L'_i$ and $R'_i$ in each channel. For example, the data of the 12-bit words of the word numbers 0, 2, 4, and 6 are inserted into the data region of the 16-bit words of the word numbers 0, 2 and 4.

Moreover, in one embodiment of the invention, since the encoding processing is performed using eight bits as one symbol, one word is divided into the higher significant eight bits and the lower significant eight bits. FIGS. 10A and 10B show the whole code constitution including the PCM data in the L and R channels which have the fundamental array shown in FIG. 8 and the check codes of each of the error detection code $C_1$ and error correction code $C_2$. In FIGS. 10A and 10B, a suffix A indicates a symbol of the higher significant eight bits and a suffix B represents a symbol of a lower significant eight bits.

Generally, in rotary head type tape recorders, the contact conditions between the rotary head and the magnetic tape at the edge portion where the slide contact therebetween is started and at the edge portion where the slide contact is ended are bad, so that this causes an error rate to be raised. Therefore, the check code symbol Q of the error correction code $C_2$ and the check code symbol P of the error detection code $C_1$ regarding this are arranged respectively in the blocks having the block addresses of (0–15) (FIG. 10A) and in the blocks having the block addresses of (112–127) (FIG. 10B) which correspond to these edge portions. The audio PCM data and the check code symbol P regarding this are arranged in the blocks of the block addresses of (16–111) corresponding to the central section. It is also possible to arrange the check code symbol Q and the check code symbol P of the error detection code $C_1$ regarding this in the central section and to arrange the even number designated audio PCM data and the odd number designated audio PCM data in the sections on both sides.

The error detection code $C_1$ is the Reed Solomon Codes over GF ($2^8$) of (32, 30) and the code sequence has the two-block completion type interleave for allowing errors of the block addresses to be certainly detected. For example, the error detection code $C_1$ is encoded with regard to thirty symbols ($Q_{00}$, $Q_{02}$, $Q_{04}$, $Q_{06}$, ..., $Q_{028}$, $Q_{01}$, $Q_{03}$, ..., $Q_{025}$, $Q_{027}$, $Q_{029}$) which locate in the even number designated addresses in the blocks of each of the block addresses 0 and 1 and the check code symbols of $P_{00}$ and $P_{01}$ are added. Similarly with respect to the block addresses 16 and 17, one code sequence of the error detection code $C_1$ is formed by thirty two symbols ($L_{0A}$, $L_{0B}$, $L_{2A}$, $L_{2B}$, ..., $L_{290A}$, $L_{290B}$, $L_{292A}$, $L_{292B}$, ..., $L_{580A}$, $L_{580B}$, $P_{160}$, $P_{161}$) which locate in the even number designated addresses in the blocks of each block address. In addition, one code sequence of the error detection code $C_1$ is, formed by thirty two symbols ($R_{0A}$, $R_{0B}$, ..., $R_{290A}$, $R_{290B}$, ..., $R_{580A}$, $R_{580B}$, $P_{170}$, $P_{171}$) which locate in the odd number designated addresses in the blocks of the block addresses 16 and 17.

On the other hand, in case of the 12-bit data, the encoding processing is performed using six bits as one symbol, so that one word is divided into higher significant six bits and lower significant six bits.

FIGS. 11A and 11B show an example corresponding to a part of FIG. 10A, and the error check code symbols P and Q of the error detection code sequence $C_1$ and error correction code sequence $C_2$ may be processed on an eight bit unit basis; in such a case, no problem will be caused.

Therefore, the encoding of the error detection code $C_1$ is performed with respect to thirty symbols ($Q_{00}$, $Q_{02}$, $Q_{04}$, $Q_{06}$, ..., $Q_{028}$, $Q_{029}$, $Q_{01}$, $Q_{03}$, ..., $Q_{025}$, $Q_{027}$) which locate in the even number designated addresses in the blocks of each of the block addresses of, e.g., 0 and 1, and the check code symbols of $P_{00}$ and $P_{01}$ are added. Moreover, one code sequence of the error detection code $C_1$ is formed by forty two symbols ($L'_{0A}$, $L'_{0B}$, $L'_{2A}$, $L'_{2B}$, ..., $L'_{384A}$, $L'_{384B}$, $L'_{386A}$, $L'_{386B}$, ..., $L'_{774A}$, $L'_{774B}$, $P_{160}$, $P_{161}$) which locate in the even-number designated addresses in the blocks of each of the block addresses of 16 and 17. These are similar to the R channel as well.

It will be appreciated from this example that, in the code constitutions shown in FIGS. 10A, 10B, 11A, and 11B, two symbols which constitute the same word are included in the same code sequence of the error detection code $C_1$. This is because in the cases where this code sequence is detected as the error and where it cannot be corrected by the error correction code $C_2$, this error word can be interpolated by fifteen words (in case of 16 bits) or by twenty words (in case of 12 bits).

In addition, the data in one channel in the data of two channels is concentrated in the code sequence of the error detection code $C_1$. However, since the symbols of the mutually corresponding symbol numbers in two channels are alternately recorded, there will hardly occur the case such that the errors concentrically occur in only one channel when recording.

An example of the H matrix of the error detection code $C_1$ is shown below.

$$H = \begin{pmatrix} 1 & 1 & 1 & \ldots & 1 & 1 & 1 & 1 \\ \alpha^{31} & \alpha^{30} & \alpha^{29} & \ldots & \alpha^3 & \alpha^2 & \alpha & 1 \end{pmatrix}$$

in which, $\alpha$ is any element over GF ($2^8$).

Assuming that the matrix of the reproduction data sequence of 32 symbols which include two parity symbols is V and that its transposed matrix is $V^T$, the decoding of the error detection code $C_1$ is performed by forming two syndromes by the arithmetic operation of $H \cdot V^T$. When both of these syndromes are 0, it means that no error is detected, and in the other cases, it means that errors are detected. The error correction code $C_1$ is inherently the code in which a single error can be corrected and double or more-tuple errors can be detected.

In addition, 128 blocks are divided into 32 sections each consisting of four blocks and the code sequence of the error correction code $C_2$ is formed by 32 symbols fetched from each four blocks. This error correction code $C_2$ is the Reed Solomon Codes over GF ($2^8$) of (32, 24) and eight check code symbols are formed with regard to total 24 symbols of the blocks at every four blocks (for example, the block addresses of 16, 20, 24, ..., 104, and 108) among the 96 blocks of the block addresses of 16 to 111. These check code symbols are arranged to the addresses at every four blocks (e.g., the block addresses of 0, 4, 8, 12, 112, 116, 120, and 124).

That is, the interleave of four blocks is performed regarding the error correction code $C_2$ and the check code symbols of the error correction code $C_2$ locate in thirty two blocks of the block addresses of 0 to 15 and 112 to 127. However, the check code symbols of the error detection code $C_1$ regarding these check code symbols are arranged in the addresses 30 and 31 in the block.

The error correction code $C_2$ is the code in which a four-tuple error can be corrected and when the erasure correction is performed using a pointer, an eight-tuple error can be corrected. An example of the H matrix of the error correction code $C_2$ is shown below.

$$H = \begin{pmatrix} 1 & 1 & 1 & \ldots & 1 & 1 & 1 & 1 \\ \alpha^{29} & \alpha^{28} & \alpha^{27} & \ldots & \alpha^3 & \alpha^2 & \alpha & 1 \\ . & . & . & \ldots & \alpha^6 & \alpha^4 & \alpha^2 & 1 \\ . & . & . & \ldots & \alpha^9 & \alpha^6 & \alpha^3 & 1 \\ . & . & . & \ldots & \alpha^{12} & \alpha^8 & \alpha^4 & 1 \\ . & . & . & \ldots & \alpha^{15} & \alpha^{10} & \alpha^5 & 1 \\ . & . & . & \ldots & \alpha^{18} & \alpha^{12} & \alpha^6 & 1 \\ . & . & . & \ldots & \alpha^{21} & \alpha^{14} & \alpha^7 & 1 \end{pmatrix}$$

In this way, both codes $C_1$ and $C_2$ have the same code length of 32 symbols, so that this enables a hardware to be simplified. In addition, when decoding, the error detection is simply performed using the error correction code $C_1$; on the other hand, when errors are detected, a pointer is set into its code sequence and the error correction is then performed using the error correction code $C_2$. This error correction is carried out with respect to each of the addresses 0 to 29 in the block, so that the decoding operations are done thirty times.

Figure 12A:
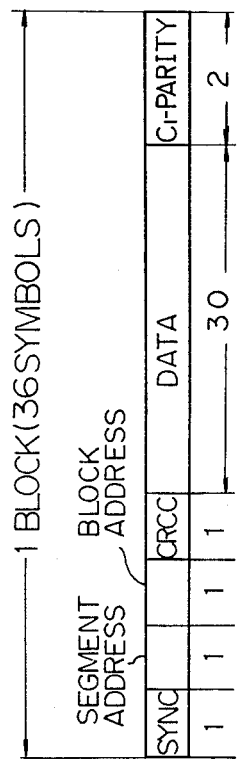
FIGS. 12A and 12B are schematic diagrams showing a format of a record data in one embodiment of the invention.

Each block in the arrays shown in FIGS. 10A and 10B has a data format shown in FIG. 12A. Namely, a block sync signal of eight bits (one symbol) is added to the head, and a segment address of eight bits and a block address of eight bits are added, then a CRC code (eight bits) for error detection of these segment address and block address is added. An MSB of the block address is used to discriminate the block address of the data from the block address of the subcode. Furthermore, the data of 30 symbols (audio data or check code symbols Q of the error correction code $C_2$) are arranged after this CRC code. Two check code symbols P of the error correction code $C_1$ are arranged in the last portion.

Figure 12B:
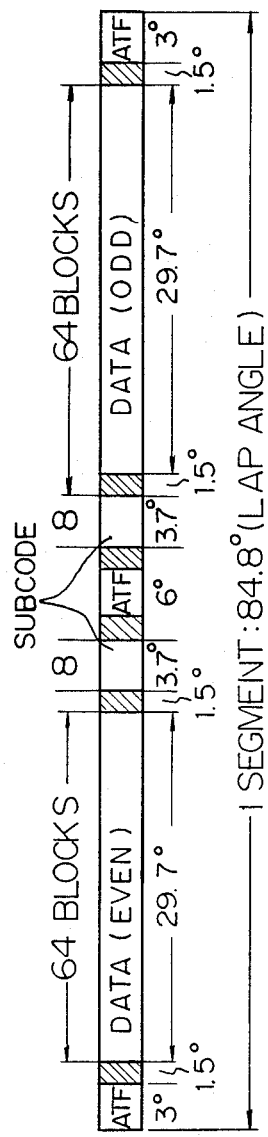

On the other hand, the data of one segment which is produced by the rotary head has a data format shown in FIG. 12B. In this embodiment, one segment is formed by the rotary head in the oblique direction of the magnetic tape which was wrapped at an angle of 84.8° around a tape guide drum having a diameter of 30 mm. Pilot signals ATF for automatically following the track are recorded in each interval of 3° in both end portions and central portion of this segment. The reason why the pilot signals are recorded in these three portions is to prevent a fear such that the pilot signals cannot be reproduced due to the dropout. A tracking error is detected due to the reproduction output of these pilot signals ATF and a piezo-electric element which supports the rotary head is driven on the basis of this detection, thereby removing the tracking error.

In addition, the data of the block addresses (0 to 63) shown in FIG. 10A are sequentially recorded in a range of an angle of 29.7°. Furthermore, the subcodes of four blocks such as time codes, display data and the like are written twice before and after the pilot signal ATF in the central portion. The data of the block addresses (64 to 127) shown in FIG. 10B are sequentially recorded in a range of 29.7°. Also, in FIG. 12B, the intervals of each angle of 1.5° in the hatched portions denote the interblock gaps where no data is recorded and pulse signals of a constant frequency are recorded in these intervals.

Figure 13:
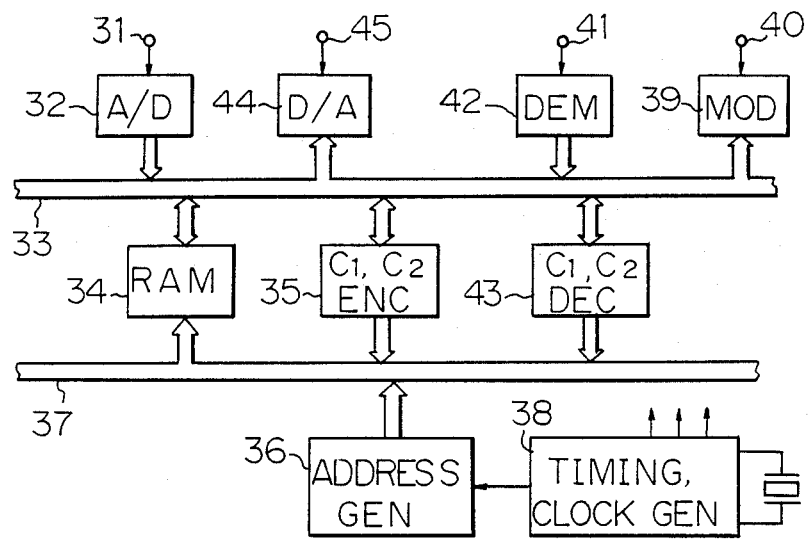
FIG. 13 is a block diagram showing a recording/reproducing circuit in one embodiment of the present invention.

FIG. 13 shows a constitution of a recording/reproducing circuit of one embodiment of the present invention, in which an analog audio signal is supplied to an input terminal 31. This analog audio signal is digitized by an A/D converter 32. The audio PCM signal from the A/D converter 32 is input as the data input to an RAM 34 through a data bus 33. The RAM 34 has the memory capacity which can store the data of the unit (2880 symbols in the foregoing example) of which the error correction code is encoded.

In addition, the data read out from the RAM 34 is supplied to an encoder 35 for the error detection code $C_1$ and error correction code $C_2$. An address data generated from an address generator 36 is supplied to the RAM 34 through an address bus 37. This address data can be interleaved to change the sequence of the PCM data to the original sequence. The interleaved data is read out from the RAM 34 and is supplied to the encoder 35, then the check code symbols of the error detection code $C_1$ and error correction code $C_2$ are formed and these check code symbols are written in the RAM 34. Upon completion of the production of the check code symbols, the data including these check code symbols is read out from the RAM 34 for every block and is supplied to a digital modulator 39.

Although not shown, the processings to add the block address, segment address and block sync signal are executed. The rotary head is connected to an output terminal 40 of the digital modulator 39 through a recording amplifier and a rotary transformer.

Also, the signal reproduced from the magnetic tape by the rotary head is supplied to a digital demodulator 42 through a rotary transformer and a reproducing amplifier and the demodulated data is written in the RAM 34 through the data bus 33. The data read out from the RAM 34 is supplied to a decoder 43 and is subjected to the processings of the error detection and error correction. The data processed by this decoder 43 is written in the RAM 34 and the PCM data which was de-interleaved to the original sequence is read out from the RAM 34 and is supplied to a D/A converter 44, so that the reproduction audio signal is fetched from an output terminal 45.

The address data to the RAM 34 upon reproduction is also produced by the address generator 36. The clock pulses and timing signals necessary to control the above-mentioned processings upon recording and reproduction are produced by a clock timing generator 38 which includes a crystal oscillator therein.

On one hand, when the sampling frequency is 32 kHz and the number of quantization bits is twelve bits, the running speed of the magnetic tape and the rotating speed of the rotary head are reduced by half as compared with those in the case where the sampling frequency is 48 kHz. Due to this, assuming that the recording density is constant, the time when the recording on, e.g., one set of cassette tape is possible can be doubled.

In case of dividing the input data sequence and transmission data sequence into a plurality of sets, they have been divided into the even number sets and the odd number sets in the present embodiment; however, the invention is not limited to this. For instance, when a multiple of three is written as 3n, those sequences may be divided into three sets of (3n), (3n+1) and (3n+2) or into four sets of (4n), (4n+1), (4n+2), and (4n+3).

Figure 14:
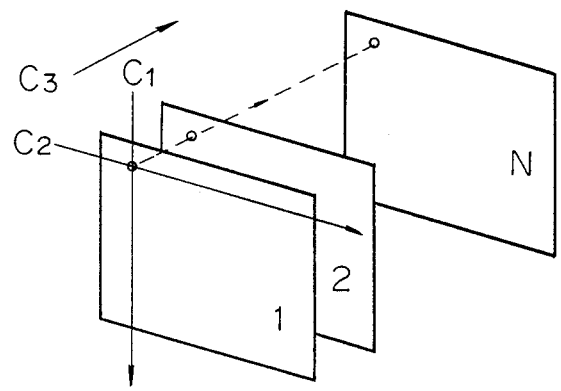
FIG. 14 is a schematic diagram which is used to describe another embodiment of the invention.

In addition, with regard to N blocks of the two-dimensional construction in which the error correction code $C_1$ was encoded in, the vertical direction and the error correction code $C_2$ was encoded in the horizontal direction as shown in FIG. 14, the present invention can be applied to the case where the error detection code $C_3$ is encoded regarding N words at the corresponding locations of each block. For example, as the error correction codes $C_1$ and $C_2$, the Reed Solomon Codes of (15, 13) are used, while the CRC codes are used as the error detection code $C_3$. In the case where there are three kinds of word lengths of eight bits, twelve bits and sixteen bits, a length of one code sequence of the error detection code $C_3$ is set into 144 bits which are integer times larger than 48 bits of a least common multiple of these bit numbers.

On one hand, the present invention can be also applied to the case where any digital information such as a digital video signal or the like other than the digital audio signal is transmitted. It is obvious that the invention can be also applied to the case where a magnetic disc recording apparatus or the like other than the rotary head type recording apparatus is used.

According to the present invention, even in the time sequence of transmission data, the odd number and even number words are respectively inserted in the odd number and even number time slots on the basis of the original time sequence; therefore, in case of performing the even/odd interleave, it is possible to prevent that the error correcting ability remarkably decreases due to a difference in bit number.

In this invention, the processings for error correction encoding can be commonly performed with respect to a plurality of number of quantization bits, thereby enabling a general encoder to be realized.

Furthermore, the present invention has an advantage such that in the case where the errors which exceed the correcting ability for the error correction code occur, it is possible to prevent that the data amount which cannot be used is doubled since there is a difference between the quantization bit numbers.

Although the present invention has been shown and described with respect to preferred embodiments, various changes and modifications which are obvious to a person skilled in the art to which the invention pertains are deemed to lie within the spirit and scope of the invention.

What is claimed is:

1. A data transmitting method for uniformly processing and transmitting data, said method comprising the steps of:

taking a plurality of samples of an analog signal;

generating bits forming digital words respectively corresponding to said samples, the number of bits representing each sample being switchable between a plurality of values M and N, and supplying first input data occuring in first words of which each said first word consists of M bits and second input data occurring in second words of which each said second word consists of N bits;

defining an a-th first word of said M-bit first input data as $W_a$;

dividing said first input data into k kinds of sets of $(W_{nk+1})$, $(W_{nk+2})$, ..., $(W_{nk+k})$, n being an arbitrary integer;

defining a b-th word of said N-bit second input data as $W_b$;

dividing said second input data into k kinds of sets of $W'_{nk+1}$, $(W'_{nk+2})$, ..., $(W'_{nk+k})$, the number of bits of the first words in the set of $(W_{nk+m})$, m being an integer from 1 to k, being equal to the number of bits of the second words in the set of $(W'_{nk+m})$; and separately processing and transmitting said data in each of said sets.

2. A data transmitting method according to claim 1, wherein M is twelve and N is sixteen.

3. A data transmitting method according to claim 1, wherein M is six and N is eight.

4. A data transmitting method according to claim 1, wherein k is two, and said sets $(W_{nk-1})$ and $(W_{nk+2})$ are even number designated data and said sets $(W'_{nk+1})$ and $(W'_{nk+2})$ are odd number designated data, respectively.

5. Data transmitting apparatus for uniformly processing and transmitting data, said apparatus comprising:

means for taking a plurality of samples of an analog signal;

means for generating bits forming digital words respectively corresponding to said samples, the number of bits representing each sample being switchable between a plurality of values M and N, and for supplying first input data occuring in first words of which each said first word consists of M bits and second input data occurring in second words of which each said second word consists of N bits;

means responsive to said generating means for dividing said first input data k kinds of sets of $(W_{nk+1})$, $(W_{nk+2})$, ..., $(W_{nk+k})$, n being an arbitrary integer and an a-th first word of said M-bit first input data being defined as $W_a$ and for dividing said second input data into k kinds of sets of $(W'_{nk+1})$, $(W'_{nk+2})$, ..., $(W'_{nk+k})$, wherein a b-th word of said N-bit second input data is defined as $W_b$, and wherein the number of bits of the first words in the set of $(W_{nk+m})$, m being an integer from 1 to k, equals the number of bits of the second words in the set of $(W'_{nk+m})$; and means for separately processing and transmitting said data in each of said sets.

6. A data transmitting apparatus according to claim 5, wherein M is 12 and N is 16.

7. A data transmitting apparatus according to claim 5, wherein M is 6 and N is 8.

8. A data transmitting apparatus according to claim 5, wherein k is 2 and sets $(W_{nk+1})$ and $(W_{nk+2})$ are even number designated data and said sets $(W'_{nk+1})$ and $(W'_{nk+2})$ are odd number designated data, respectively.

9. A data transmitting method for uniformly processing and transmitting data, said method comprising the steps of:

taking a plurality of samples of an analog signal;

generating bits forming digital words respectively corresponding to said samples, the number of bits representing each sample being switchable between a plurality of values M and N, and supplying first input data occurring in first words each consisting of M bits and second input data occurring in second words each consisting of N bits;

receiving a selected one of said first input data and said second input data;

allocating the received input data into k kinds of input sets $(W_{nk+1})$, $(W_{nk+2})$, ..., $(W_{nk+k})$, n and k being positive integers and each said input set including n words of said received input data;

allocating said data of said input sets into k kinds of output sets $(W'_{nk+1})$, $(W'_{nk+2})$, ..., $(W'_{nk+k})$, such that the bits of the words in the input set $(W_{nk+m})$ are the bits in the output set $(W'_{nk+m})$, each said output set having a number of bits equal to a multiple of a selected one of M and N; and separately processing and transmitting said received input data in each of said output sets.

10. A data transmitting method according to claim 9, wherein M is 12 and N is 16.

11. A data transmitting method according to claim 9, wherein M is 6 and N is 8.

12. A data transmitting method according to claim 9, wherein k is 2, and said sets $(W_{nk+1})$ and $(W_{nk+2})$ are even number designated data and said sets $(W'_{nk+1})$ and $(W'_{nk+2})$ are odd number designated data, respectively.

13. A data transmitting apparatus for uniformly processing and transmitting data, said apparatus comprising:

means for taking a plurality of samples of an analog signal;

means for generating bits forming digital words respectively corresponding to said samples, the number of bits representing each sample being switchable between a plurality of values M and N, and for supplying first input data occurring in first words each consisting of M bits and second input data occurring in second words each consisting of N bits;

allocating means for allocating the received input data into k kinds of input sets $(W_{nk+1})$, $(W_{nk+2})$, ..., $(W_{nk+k})$, N and k being positive integers and each said input set including n words of said received input data and for allocating said data of said input sets into k kinds of output sets $(W'_{nk+1})$, $(W'_{nk+2})$, ..., $(W'_{nk+k})$, such that the bits of the words in the input sets $(W_{nk+m})$ are the bits in the output set $(W'_{nk+m})$, each said output set having a number of bits equal to a multiple of a selected one of M and N; and means responsive to said allocating means for separately processing and transmitting said received input data in each of said output sets.

14. A data transmitting apparatus according to claim 13, wherein M is 12 and N is 16.

15. A data transmitting apparatus according to claim 13, wherein M is 6 and N is 8.

16. A data transmitting apparatus according to claim 13, wherein k is 2, and said sets $(W_{nk+1})$ and $(W_{nk+2})$ are even number designated data and said sets $(W'_{nk+1})$ and $(W'_{nk+2})$ are odd number designated data, respectively.

* * * * *